United States Patent
Mizumoto et al.

(10) Patent No.: US 9,971,715 B2
(45) Date of Patent: May 15, 2018

(54) COMMUNICATION DEVICE AND LINK ESTABLISHMENT METHOD

(71) Applicant: OMRON Corporation, Kyoto-shi, Kyoto (JP)

(72) Inventors: Hirohito Mizumoto, Kyoto (JP); Yoshimi Niwa, Kusatsu (JP); Megumu Asano, Moriyama (JP); Hajime Ujiie, Takatsuki (JP); Satoshi Yamawaki, Ritto (JP)

(73) Assignee: OMRON Corporation, Kyoto-shi (JP)

( * ) Notice: Subject to any disclaimer, the term of this patent is extended or adjusted under 35 U.S.C. 154(b) by 196 days.

(21) Appl. No.: 14/950,063

(22) Filed: Nov. 24, 2015

(65) Prior Publication Data

US 2016/0292102 A1    Oct. 6, 2016

(30) Foreign Application Priority Data

Mar. 31, 2015 (JP) ................. 2015-074289

(51) Int. Cl.
*G06F 13/38* (2006.01)
*G06F 13/36* (2006.01)
(Continued)

(52) U.S. Cl.
CPC .............. *G06F 13/36* (2013.01); *G06F 13/38* (2013.01); *G06F 13/4265* (2013.01); *H04L 12/407* (2013.01); *H04L 12/40169* (2013.01)

(58) Field of Classification Search
CPC ........ G06F 13/10; G06F 13/12; G06F 13/128; G06F 13/14; G06F 13/38; G06F 13/40;
(Continued)

(56) References Cited

U.S. PATENT DOCUMENTS 6,148,002 A    11/2000  Patel et al.
6,580,697 B1 *  6/2003  Gardner ............... H04L 5/1446
                                                      370/296
(Continued)

FOREIGN PATENT DOCUMENTS

CN    1642089 A    7/2005
CN    1739265 A    2/2006
(Continued)

OTHER PUBLICATIONS

Hernandez, Rich. "Gigabit Ethernet Auto-Negotiation". Issue 1. Dell. Online 2001. Retrieved from Internet Aug. 2, 2017. <http://www.dell.com/content/topics/global.aspx/power/en/ps1q01_hernan?c=us&l=en&cs=04>.*

(Continued)

*Primary Examiner* — Thomas J Cleary
(74) *Attorney, Agent, or Firm* — Metrolexis Law Group, PLLC

(57) ABSTRACT

A slave device is realized that establishes a link with a master device or another slave device such that a large link delay hardly occurs. The slave device includes a PHY unit, a COM unit, and a MPU unit. The PHY unit starts an operation according to the specification of the AutoMDI/MDI-X function when the slave device is turned on or the PHY unit itself is reset. After a predetermined time period has elapsed, the MPU unit resets the COM unit, and the PHY unit is reset in response to the reset of the COM unit.

11 Claims, 12 Drawing Sheets

(51) Int. Cl.
*G06F 13/42* (2006.01)
*H04L 12/40* (2006.01)
*H04L 12/407* (2006.01)

(58) Field of Classification Search
CPC .. G06F 13/4004; G06F 13/42; G06F 13/4265; G06F 15/163; G06F 15/173; G06F 15/17337; G06F 15/17343; G06F 15/1735; G06F 15/177; G06F 13/36
See application file for complete search history.

(56) References Cited

U.S. PATENT DOCUMENTS

| | | | | |
|---|---|---|---|---|
| 6,603,741 | B1 * | 8/2003 | Poulter | H04L 1/0002 370/252 |
| RE39,812 | E * | 9/2007 | Edem | H04L 12/413 370/447 |
| 7,570,657 | B1 * | 8/2009 | Lo | H04L 49/3054 370/465 |
| 7,616,587 | B1 * | 11/2009 | Lo | H04L 41/0806 370/254 |
| 2002/0041571 | A1 * | 4/2002 | Huff | H04L 49/351 370/252 |
| 2002/0046267 | A1 * | 4/2002 | Andra | H04L 12/40032 709/220 |
| 2005/0152443 | A1 | 7/2005 | Ueno | |
| 2006/0072624 | A1 | 4/2006 | Akita et al. | |

FOREIGN PATENT DOCUMENTS

| | | | | |
|---|---|---|---|---|
| CN | 102308264 A | | 1/2012 | |
| EP | 1580937 A1 * | | 9/2005 | ....... H04L 12/40136 |
| JP | H09-128019 A | | 5/1997 | |
| JP | 2008-245271 A | | 10/2008 | |
| JP | 2014-119907 A | | 6/2014 | |

OTHER PUBLICATIONS

The Chinese Office Action dated Nov. 16, 2017 in the counterpart Chinese patent application.

* cited by examiner

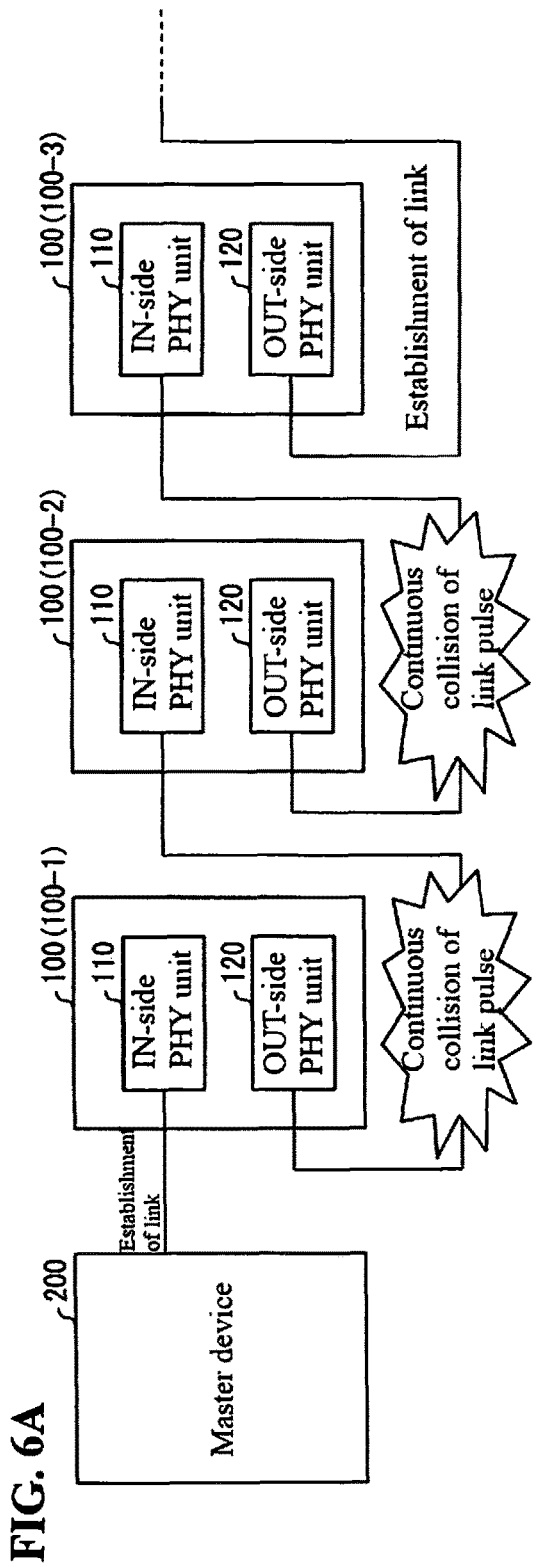
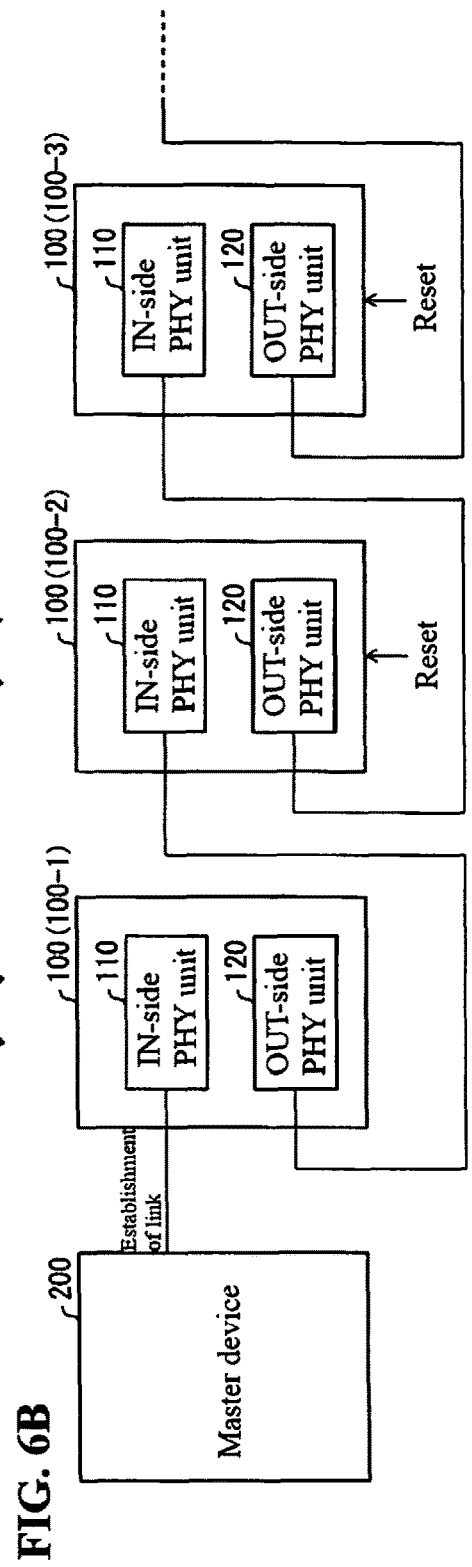
FIG. 6A
FIG. 6B

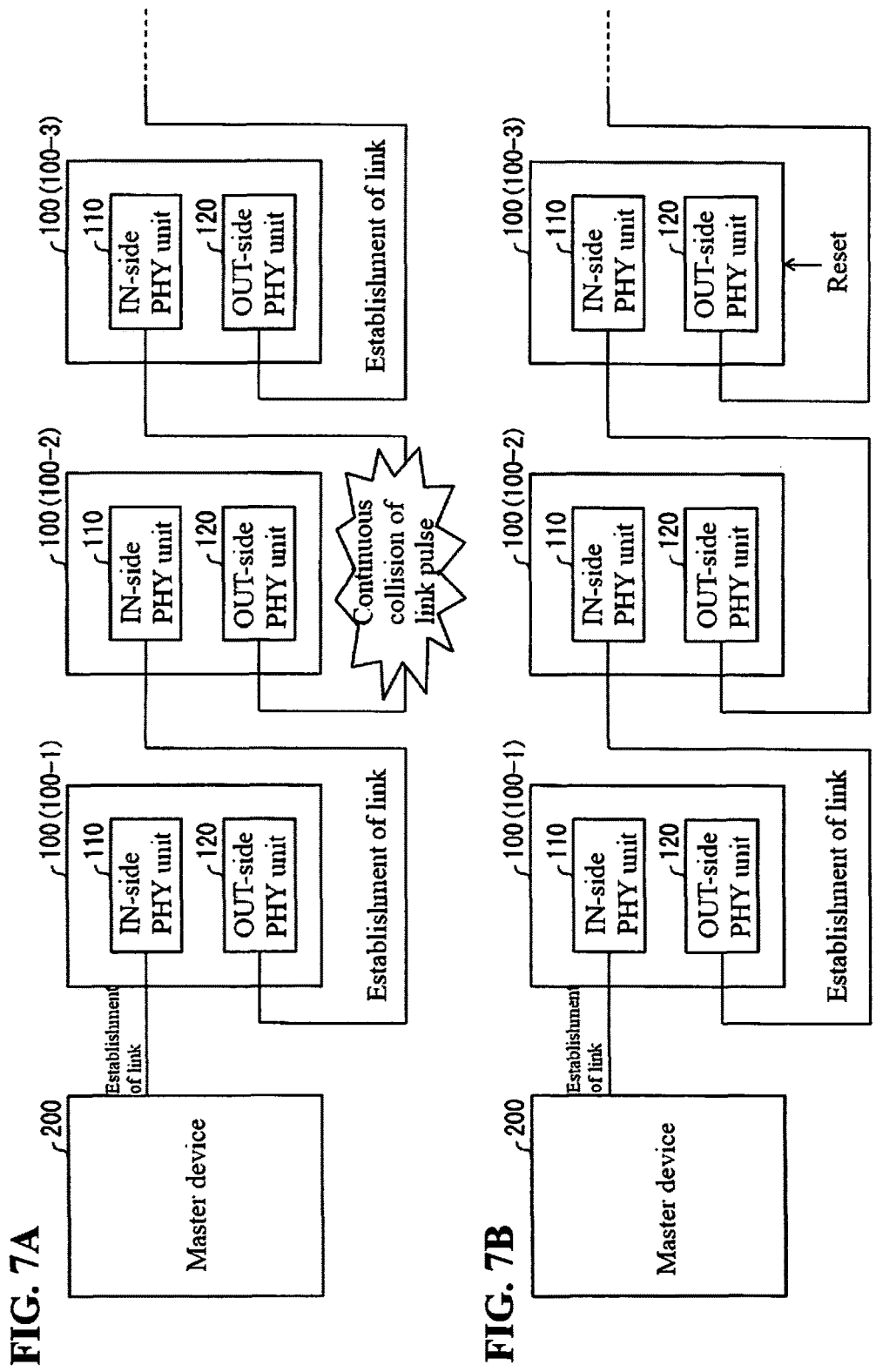

Conventional technique

COMMUNICATION DEVICE AND LINK ESTABLISHMENT METHOD

CROSS-REFERENCE TO RELATED APPLICATION

This application claims priority to Japanese Patent Application No. 2015-074289 filed Mar. 31, 2015, the entire contents of which are incorporated herein by reference.

FIELD

The present invention relates to a communication device that is connected to a master device or a slave device via a communication cable, and a method for establishing a link with a master device or a slave device using such a communication device.

BACKGROUND

Network systems that are constituted by a master device and a slave device are used as an industrial network system, and techniques relating to the network system are disclosed.

For example, JP 2014-119907A discloses a communication unit that is connected to a plurality of slave devices that operate based on setting information via a system bus so as to be able to communicate with the slave devices. If it is determined that the system has a configuration indicated by stored configuration information, the communication unit transmits setting information included in the configuration information to the slave devices. Therefore, JP 2014-119907A teaches that the communication unit can prevent an unexpected operation from occurring in the network system.

Furthermore, JP H9-128019A discloses a remote I/O system that is constituted by a remote master, and multiple IN slaves and OUT slaves that are connected to the remote master via a communication cable. In the remote I/O system, the remote master transmits OUT data simultaneously to the slaves, and the OUT slaves receive the OUT data at timings of their own nodes. On the other hand, the IN slaves sequentially transmit, based on the timing at which the OUT data is received, IN data at timings of their own nodes for each base idle time taking into consideration a frame length and a physical delay. The remote master receives the IN data from the IN slaves in a time slot based on the base idle time. Accordingly, JP H9-128019A teaches that overlap of the IN data due to a physical delay of a communication cable or the like does not occur.

JP 2014-119907A (published on Jun. 30, 2014), and JP H9-128019A (published on May 16, 1997) are examples of background art.

SUMMARY

Meanwhile, a conventional network system that includes a plurality of slave devices having completely the same specifications has the problem that when the plurality of slave devices are turned on at the same time, it takes time until all of the plurality of slave devices complete processing for establishing a link. This problem will be explained with reference to FIG. 12.

FIG. 12 schematically illustrate states of communication that poses this problem, the communication being conducted between two slave devices included in the conventional network system.

FIG. 12A illustrates the state in which link pulses collide with each other on a communication cable connecting two slave devices 10 (10a and 10b). Furthermore, FIG. 12B illustrates timings at which the two slave devices transmit link pulses.

As shown in FIG. 12A, an OUT-side PHY (Physical Layer) unit of the slave device 10a and an IN-side PHY unit of the slave device 10b are connected to each other. In this state, when the slave device 10a and the slave device 10b are turned on at the same time, the OUT-side PHY unit of the slave device 10a and the IN-side PHY unit of the slave device 10b respectively transmit the link pulses.

Here, there is a case where the OUT-side PHY unit of the slave device 10a and the IN-side PHY unit of the slave device 10b transmit the link pulses at the same timing, although the probability of occurrence of this case is not so high. In particular, if the IN-side PHY unit and the OUT-side PHY unit have the same physical layer circuit, the probability of transmitting the link pulses at the same timing will increase.

If, as shown in FIG. 12B, the OUT-side PHY unit of the slave device 10a and the IN-side PHY unit of the slave device 10b transmit link pulses at the same timing, collision of the link pulses between the slave device 10a and the slave device 10b will occur as shown in FIG. 12A.

The slave device 10a and the slave device 10b retransmit the link pulse if a predetermined time period has elapsed without their being able to receive a link pulse from the counterpart slave device.

If, as shown in FIG. 12B, the OUT-side PHY unit of the slave device 10a and the IN-side PHY unit of the slave device 10b retransmit link pulses at the same timing, collision of the link pulses between the slave device 10a and the slave device 10b as shown in FIG. 12A will again occur.

Furthermore, as shown in FIG. 12B, collision of link pulses will occur again also at the time of retransmission of the link pulses from the second time onward.

As described above, if the slave device 10a and the slave device 10b are turned on at the same time, and the OUT-side PHY unit of the slave device 10a and the IN-side PHY unit of the slave device 10b transmit link pulses at the same timing, collision of the link pulses between the two slave devices 10 will thereafter occur again and again.

Although the link between the two slave devices will eventually be established because the timings at which the two slave devices retransmit the link pulses are slightly shifted due to the following factors, it may take very long time (several tens of seconds to several hundreds of seconds) to establish the link.

Factor 1: A difference in characteristics of members (oscillator and other members) constituting the physical layer circuit between the OUT-side PHY unit of the slave device 10a and the IN-side PHY unit of the slave device 10b Factor 2: A difference in temperature between the inside of the slave device 10a and the inside of the slave device 10b.

Such problems cannot be solved even using the techniques disclosed in JP 2014-119907A and JP H9-128019A.

The present invention was made in view of the above-described problems, and it is a main object of the invention to provide a communication device and a link establishment method that establish a link with a master device or a slave device such that a large link delay hardly occurs.

In order to solve the above-described problem, a communication device according to an aspect of the present invention includes: a first communication unit for communicating with a first device, which is a master device or a slave device; and a second communication unit for communicating with a second device, which is a master device or a slave device;

wherein the first communication unit and the second communication unit are configured, when the communication device is turned on, to start an operation for transmitting a link pulse at a predetermined timing at least once so as to establish a link with the communication counterpart device, the first communication unit performs the operation during a time period from a point in time when the communication device is turned on to a given point in time, and the communication device further includes a reset processing unit configured to perform, immediately after that time period, reset processing for letting the first communication unit newly start the operation if the time period has elapsed without the link between the first communication unit and the first device being established.

According to the above-described configuration, the communication device performs the reset processing if no link with the first device cannot be established even after the time period has elapsed.

Accordingly, if the reason why the communication device cannot establish the link with the first device even after the elapse of the time period is that a link pulse transmitted by the communication device and a link pulse transmitted by the first device collide with each other at the predetermined timing, the communication device can substantially reliably eliminate, by performing the reset processing, the reason why the communication device cannot establish the link with the first device even after the elapse of the time period.

That is, the communication device can substantially reliably establish the link with the first device immediately after the reset processing (immediately after the time period).

Accordingly, the communication device has an effect of establishing a link with the master device or a slave device such that a large link delay hardly occurs.

In order to solve the above-described problem, a link establishment method according to an aspect of the present invention is a method for establishing a link between a first device, which is a master device or a slave device, and a second device, which is the master device or the slave device, the method being performed by a communication device including a first communication unit for communicating with the first device and a second communication unit for communicating with the second device, the method comprising:

a transmitting step for the first communication unit and the second communication unit transmitting a link pulse at a predetermined timing at least once so as to respectively establish links with the communication counterpart devices, the transmitting step serving as a step that is started when the communication device is turned on, the first communication unit continuing the transmission of a link pulse at a predetermined timing in the transmitting step during a time period from a point in time when the communication device is turned on to a given point in time, the method further comprising:

a reset processing step for performing reset processing for letting the first communication unit newly start the transmission of a link pulse at a predetermined timing, the reset processing step being a step that is started immediately after the time period has elapsed without a link between the first communication unit and the first device being established.

According to the above-described configuration, the link establishment method has the same function effect as that of the communication device.

According to the communication device of an aspect of the present invention, the first communication unit may be a communication unit on a communication upstream side, and the second communication unit may be a communication unit on a communication downstream side.

Here, an industrial network system having a linear (daisy-chain) network topology, and in which a node on one end serves as the master device and all the remaining nodes serve as the slave device is taken into consideration.

The communication unit on a communication upstream side is a communication unit that is connected to the node on one end of the industrial network system via a communication cable. The communication unit on a communication downstream side (OUT-side) is a communication unit that is connected, via a communication cable, to a node on an opposite end of the industrial network system that is different from the one end.

According to the above-described configuration, if a link with the master device cannot be established due to repeated collision between a link pulse transmitted by the communication device and a link pulse transmitted by the master device, the communication device serving as the node adjacent to the node on the one end (master device) establishes a link with the master device by performing the reset processing.

That is, the master device to be provided is not necessarily a master device that supports the reset processing taking into consideration the case where the link between the communication device and the master device cannot be established due to the above-described reason.

Accordingly, the communication device has a further effect of allowing a person who desires to configure the industrial network system that includes a master device and the communication device serving as the slave device to select the master device from among various types of generally available master devices that do not support the reset processing.

The communication device according to an aspect of the present invention may include a communication controller unit, wherein the first communication unit and the second communication unit are configured to start the operation, with a reset serving as a trigger, the first communication unit and the second communication unit may be configured to be reset in response to the reset of the communication controller unit, and the communication device may further include, as the reset processing unit, a processor unit configured to reset the communication controller unit immediately after the time period.

According to the above-described configuration, the communication device has a further effect over the conventional communication device that it is possible to form the processor unit only by changing the design so that the processor unit functions as the reset processing unit (without the need of changing a circuit design).

The communication device according to an aspect of the present invention may include a communication controller unit functioning as the reset processing unit, wherein the first communication unit and the second communication unit are configured to start the operation, with a reset serving as a trigger, and the communication controller unit may be configured to reset the first communication unit immediately after the time period.

According to the above-described configuration, the communication device has a further effect over the conventional communication device that it is possible to form the communication controller unit only by changing the design so that the communication controller unit functions as the reset processing unit (without the need of changing a circuit design).

In the communication device according to an aspect of the present invention, the time period may be a time period having a predetermined length from when the communication device is turned on.

According to the above-described configuration, the communication device has a further effect that the link with the first device can substantially reliably be established after a time period of a predetermined length from when the communication device is turned on.

The communication device according to an aspect of the present invention may further include a communication controller unit; and a processor unit configured to control the communication controller unit, wherein the processor unit functions as the reset processing unit so as to reset itself immediately after the time period.

According to the above-described configuration, the communication device has a further effect over the conventional communication device that it is possible to form the processor unit only by changing the design so that the processor unit functions as the reset processing unit (without the need of changing a circuit design).

In the communication device according to an aspect of the present invention, the first communication unit is a communication unit on the communication downstream side, and the second communication unit is a communication unit on the communication upstream side, the given point in time is a point in time at which a reset request transmitted by the master device is received, and the reset processing unit resets the first communication unit immediately after the time period in accordance with the reset request.

According to the above-described configuration, the communication device has a further effect over the conventional communication device that the communication device can be prompted by the master device to establish a network at a suitable timing.

The communication device and the link establishment method according to some aspects of the present invention have an effect of establishing a link with a master device or a slave device such that a large link delay hardly occurs.

BRIEF DESCRIPTION OF THE DRAWINGS

FIGS. 6A and 6B are yet other diagrams illustrating an operation example of the industrial network system according to Embodiment 1.

FIGS. 7A and 7B are yet other diagrams illustrating the operation example of the industrial network system according to Embodiment 1.

DETAILED DESCRIPTION

Embodiment 1

Hereinafter, an industrial network system according to Embodiment 1 of the present invention will be described with reference to FIGS. 1 to 7.

Overview and Configuration of System

First, overview and configuration of the industrial network system according to the present embodiment will be described with reference to FIGS. 1 to 3.

Figure 1:
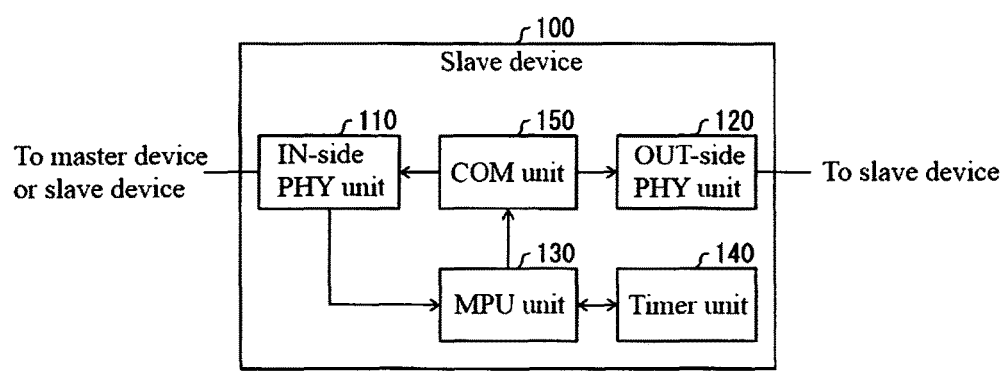
FIG. 1 is a block diagram illustrating a configuration of a slave device according to Embodiment 1 of the present invention.

FIG. 1 is a block diagram illustrating a configuration of a slave device 100 according to the present embodiment. FIG. 2 is a diagram illustrating an example of a system configuration of the industrial network system according to the present embodiment. FIG. 3 is a diagram illustrating a configuration of connection of the industrial network system according to the present embodiment.

Figure 2:
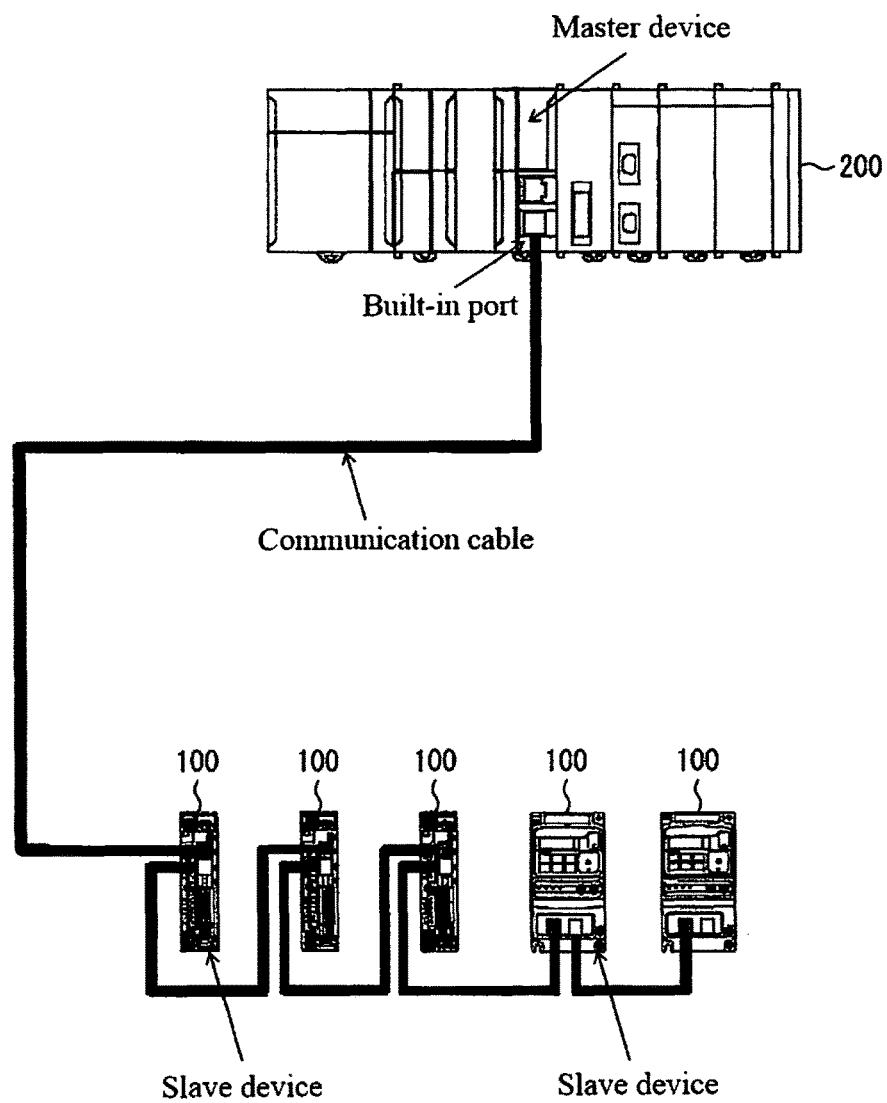
FIG. 2 is a diagram illustrating an example of a system configuration of an industrial network system including a plurality of the slave devices of FIG. 1 and one master device, according to Embodiment 1.

As is clear from FIGS. 1 and 2, the industrial network system according to the present embodiment includes multiple (five in the present embodiment) slave devices 100, and one master device 200.

Figure 3:
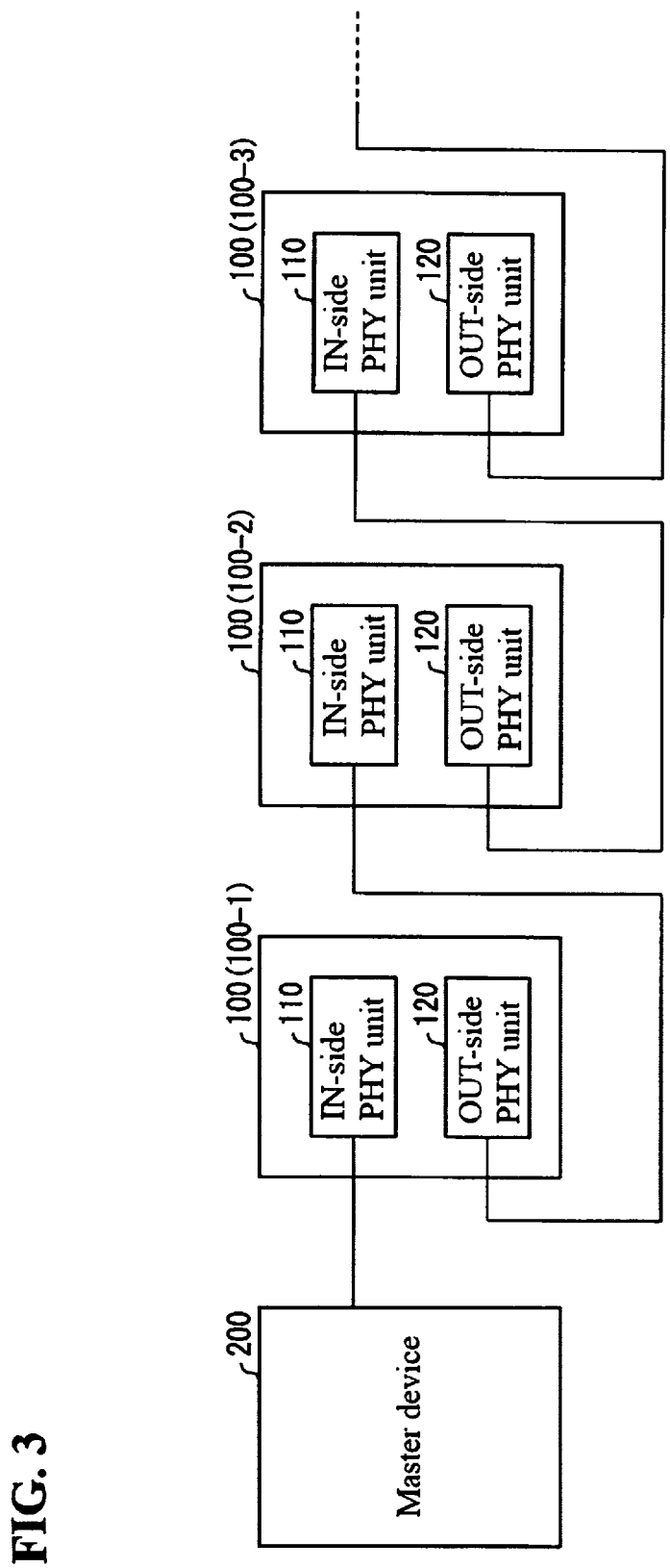
FIG. 3 is a diagram illustrating a configuration of connection of the industrial network system according to Embodiment 1.

Furthermore, as is clear from FIGS. 2 and 3, the network topology of the industrial network system according to the present embodiment is a line topology in which the master device 200 serves as a terminal node.

As is clear from FIGS. 2 and 3, the two nodes of every pair of adjacent nodes are physically connected to each other by a communication cable.

Hereinafter, the configuration of the slave device 100 will be described with reference to FIG. 1.

Configuration of Slave Device 100

As shown in FIG. 1, the slave device 100 includes an IN-side PHY unit 110, an OUT-side PHY unit 120, a MPU unit 130, a timer unit 140, and a COM unit 150.

The IN-side PHY unit 110 is a communication unit for communicating with the master device 200 or a slave device 100 (first device) (on the communication upstream side) closest to the master device 200 (first communication unit, communication unit on a communication upstream side).

The OUT-side PHY unit 120 is a communication unit for communicating with a slave device 100 (second device) (communication downstream side) far away from the master device 200 (second communication unit, communication unit on a communication downstream side).

When the slave device 100 is turned on, the IN-side PHY unit 110 and the OUT-side PHY unit 120 start an operation for establishing a link with their respective communication counterpart device (operation according to the specification of the AutoMDI/MDI-X function). Specifically, the IN-side PHY unit 110 and the OUT-side PHY unit 120 start an operation in which transmission of a link pulse at a predetermined timing is performed at least once according to the specification of the AutoMDI/MDI-X function.

The MPU unit 130 (processor unit) is a processor that controls the entire slave device 100, and control targets of the MPU unit 130 include the COM unit 150. The MPU unit 130 starts the timer unit 140 at a point in time at which the slave device 100 is turned on, and monitors whether or not a link between the IN-side PHY unit 110 and the communication counterpart device of the IN-side PHY unit 110 is established.

If a count value of the timer unit 140 shows that a predetermined time period has elapsed without the link between the IN-side PHY unit 110 and the communication counterpart device of the IN-side PHY unit 110 being established, the MPU unit 130 will perform processing for resetting the COM unit 150 immediately after the predetermined time period.

Specifically, the MPU unit 130 outputs a reset signal to a signal line (signal line for resetting the COM unit 150) of a given MPU port.

The timer unit 140 counts a time from the point in time at which the slave device 100 is turned on.

The COM unit 150 is a slave controller (communication controller unit) that performs a predetermined protocol for an industrial network.

The configuration of the slave device 100 has been described so far.

Note that in the present embodiment, reset lines of the above-described IN-side PHY unit 110 and OUT-side PHY unit 120 are connected to a reset line of the COM unit 150, although the reset lines are not shown. Accordingly, if the COM unit 150 is reset, the IN-side PHY unit 110 and the OUT-side PHY unit 120 will also be reset in response to the reset of the COM unit 150.

With the reset serving as a trigger, the IN-side PHY unit 110 and the OUT-side PHY unit 120 newly start the above-described operation for establishing a link with the communication counterpart device.

The following will briefly describe the master device 200.

Regarding Master Device 200

The master device 200 includes a PHY unit and a processor unit (both are not shown).

Similarly to the slave device 100, the master device 200 also supports the AutoMDI/MDI-X function.

That is, when the master device 200 is turned on, the PHY unit starts an operation for establishing a link with the slave device 100 that is the communication counterpart (operation according to the specification of the AutoMDI/MDI-X function).

Figure 4:
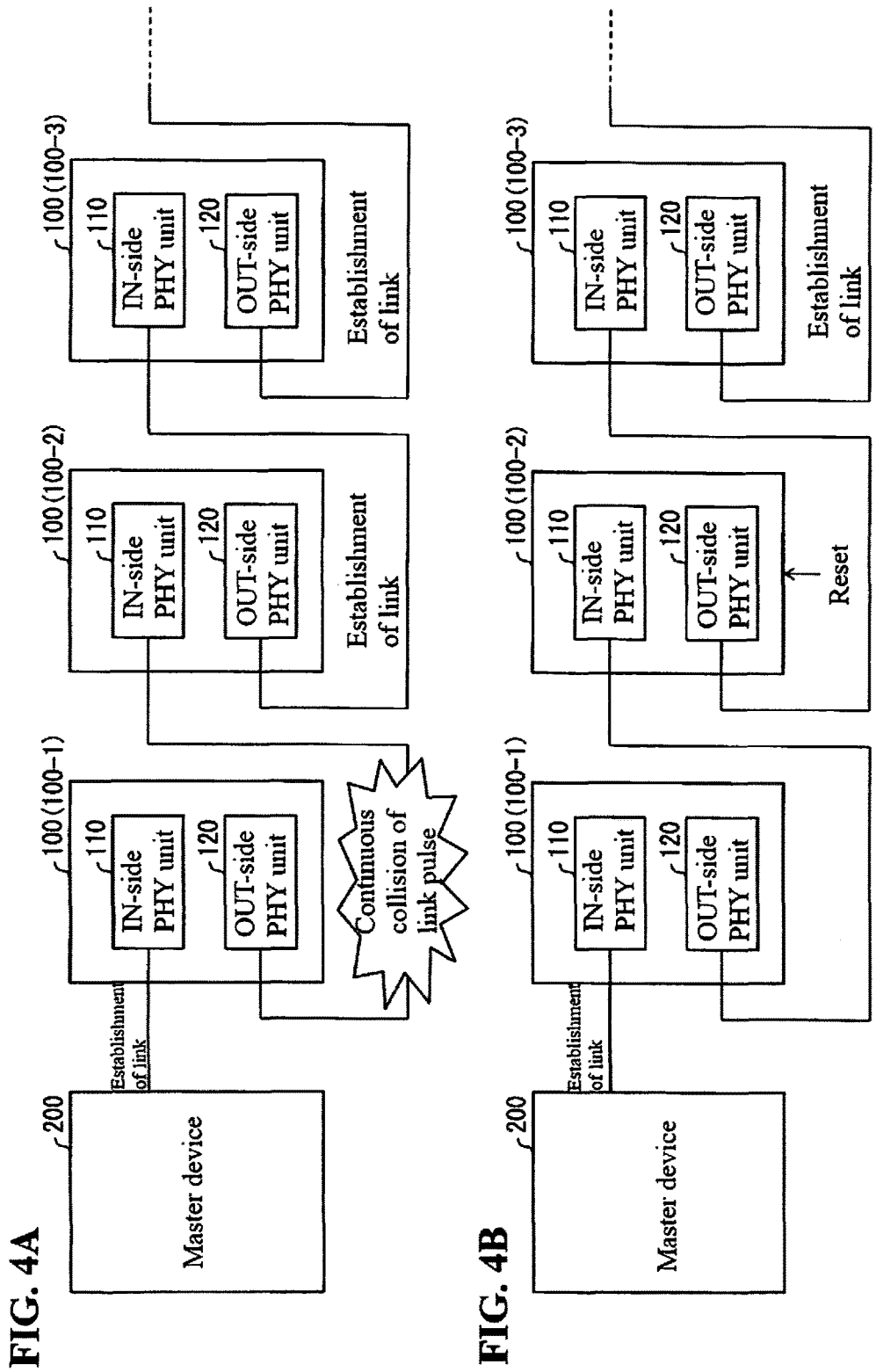
FIGS. 4A and 4B are diagrams illustrating an operation example of the industrial network system according to Embodiment 1.

The following will further describe two examples of an operation in the start-up stage of the industrial network system, in a case where all devices constituting the industrial network system according to the present embodiment are turned on at the same time, with reference to FIGS. 4 to 7. FIGS. 4 and 7 are diagrams illustrating the operation examples of the industrial network system.

Note that examples of the case where all the devices constituting the industrial network system are turned on at the same time include a case where a control board provided in facilities in which the industrial network system is installed is turned on.

Operation Example 1 of Industrial Network System

Hereinafter, Operation Example 1 of the industrial network system will be described. In Operation Example 1, a slave device 100-2 performs a specific operation, and thus the description of Operation Example 1 of the industrial network system will be given while focusing mainly on the slave device 100-2.

Assume that all the devices constituting the industrial network system are turned on at the same time, and a link between the two nodes of every pair of adjacent nodes is immediately established (except for the pair of the slave device 100-1 and the slave device 100-2).

On the other hand, assume that a link between the slave device 100-1 and the slave device 100-2 is not immediately established due to the following reason. That is, the link is not immediately established because the OUT-side PHY unit 120 of the slave device 100-1 and the IN-side PHY unit 110 of the slave device 100-2 repeatedly transmit link pulses at the same timing (as shown in FIG. 4A, collision of link pulses occurs repeatedly).

As described above, the MPU unit 130 of the slave device 100-2 starts the timer unit 140 at the point in time at which the slave device 100-2 is turned on, and starts monitoring from that point in time whether or not the link between the IN-side PHY unit 110 and the slave device 100-1 is established.

After the point in time at which the slave device 100-2 is turned on, the IN-side PHY unit 110 of the slave device 100-2 repeats the transmission of a link pulse at a predetermined timing (the same timing as the timing at which the slave device 100-1 transmits a link pulse to the slave device 100-2).

When the timer unit 140 shows that a predetermined time period (for example, four seconds) has elapsed from the point in time at which the slave device 100-2 is turned on without the link between the IN-side PHY unit 110 and the slave device 100-1 being established, the MPU unit 130 resets the COM unit 150 immediately thereafter (reset processing step, see FIG. 4B).

When the COM unit 150 is reset, the IN-side PHY unit 110 and the OUT-side PHY unit 120 of the slave device 100-2 are also reset, and the link between the slave device 100-2 and the slave device 100-3 is disconnected. By the IN-side PHY unit 110 being reset, the transmission of the link pulse at the predetermined timing in the transmission step ends.

Then, with the reset serving as a trigger, the IN-side PHY unit 110 of the slave device 100-2 newly starts the operation for establishing a link with the slave device 100-1 (operation in which the transmission of a link pulse at a predetermined timing is performed at least once).

Accordingly, a timing at which the OUT-side PHY unit 120 of the slave device 100-1 transmits a link pulse and a timing at which the IN-side PHY unit 110 of the slave device 100-2 transmits a link pulse will, in all likelihood, be shifted.

Accordingly, the link between the slave device 100-1 and the slave device 100-2 will, in all likelihood, be established immediately after the reset.

Similarly, with the reset serving as a trigger, the OUT-side PHY unit 120 of the slave device 100-2 newly starts an operation for establishing a link with the slave device 100-3. Accordingly, the link between the slave device 100-2 and the slave device 100-3 will also be established immediately after the reset.

Figure 5:
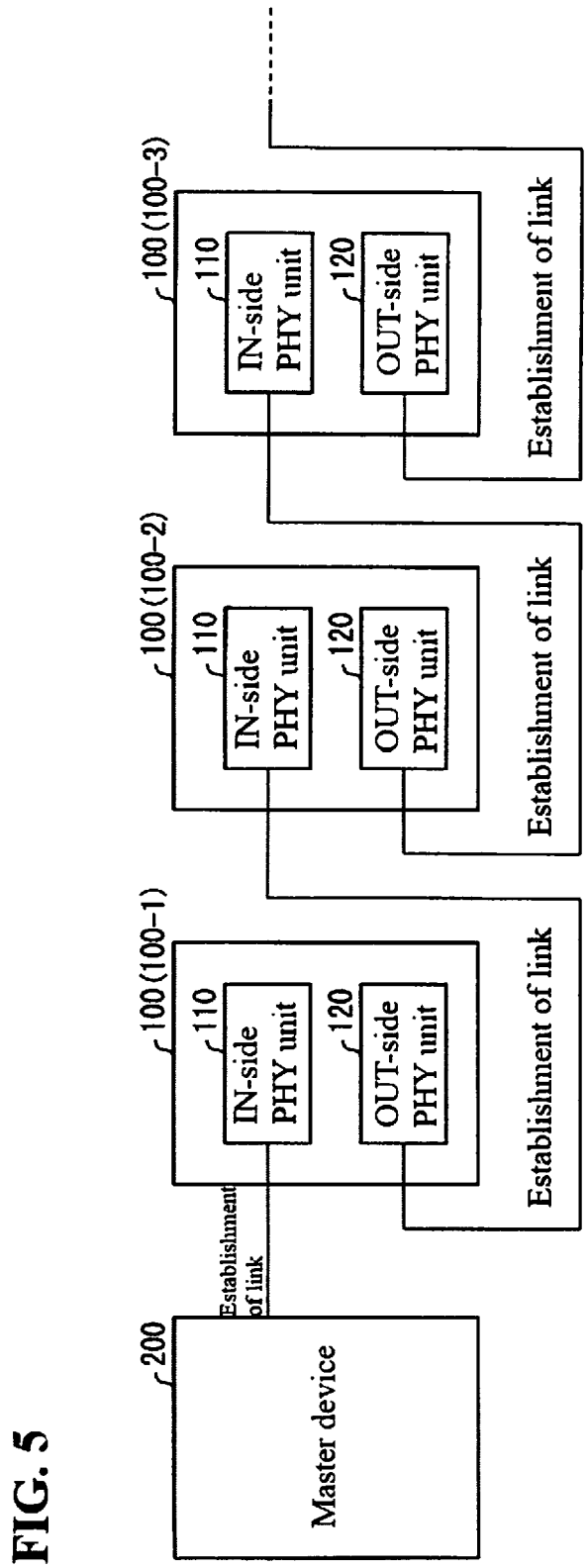
FIG. 5 is another diagram illustrating the operation example of the industrial network system according to Embodiment 1.

With the above-described link establishment method of the slave device 100-2, the link establishment operation in the industrial network system will be completed immediately after a predetermined time period (for example, four seconds) has elapsed from the point in time at which the slave device 100-2 is turned on (see FIG. 5).

Operation Example 2 of Industrial Network System

Hereinafter, Operation Example 2 of the industrial network system will be described. In Operation Example 2, the slave device 100-2 and the slave device 100-3 perform a specific operation, and thus the description of Operation Example 2 of the industrial network system will be described while focusing mainly on the slave device 100-2 and the slave device 100-3.

Assume that all the devices constituting the industrial network system are turned on at the same time, and a link between the two nodes of every pair of adjacent nodes is immediately established (except for the pair of the slave device 100-1 and the slave device 100-2, and the pair of the slave device 100-2 and the slave device 100-3).

Also, assume that, as shown in FIG. 6A, a link between the slave device 100-1 and the slave device 100-2 and a link between the slave device 100-2 and the slave device 100-3 are not immediately established due to the same reason as that described in Operation Example 1.

The MPU units 130 of the slave devices 100-2 and 100-3 start their timer units 140 at a point in time at which the respective devices are turned on, and start monitoring from that point in time whether or not the respective links between their IN-side PHY units 110 and the communication counterpart devices of the IN-side PHY units 110 are established.

When the timer units 140 of the slave devices 100-2 and 100-3 show that a predetermined time period has elapsed from the point in time at which the respective devices are turned on without the respective links between the IN-side PHY units 110 and the communication counterpart devices of the IN-side PHY units 110 being established, the MPU units 130 of the slave devices 100-2 and 100-3 respectively reset their COM units 150 immediately thereafter (see FIG. 6B)

Then, with the reset serving as a trigger, the IN-side PHY units 110 and the OUT-side PHY units 120 of the slave devices 100-2 and 100-3 newly start an operation for establishing a link with the slave device 100-1.

Accordingly, the link between the slave device 100-1 and the slave device 100-2 will be established immediately after the reset.

On the other hand, since the OUT-side PHY unit 120 of the slave device 100-2 and the IN-side PHY unit 110 of the slave device 100-3 are reset at the same time, these OUT-side PHY unit 120 and IN-side PHY unit 110 may repeatedly transmit link pulses at the same timing even after the reset.

In the present operation example, assume that since, as shown in FIG. 7A, the link pulse from that OUT-side PHY unit 120 and the link pulse from that IN-side PHY unit 110 repeatedly collide with each other, the link between the slave device 100-2 and the slave device 100-3 will not be established immediately after the reset.

When the timer unit 140 of the slave device 100-3 shows that a predetermined time period has elapsed from the point in time at which the COM unit 150 is reset without the link between the IN-side PHY unit 110 of the slave device 100-3 and the slave device 100-2 being established, the MPU unit 130 of the slave device 100-3 resets again the COM unit 150 immediately thereafter (FIG. 7B).

Then, with the reset serving as a trigger, the IN-side PHY unit 110 of the slave device 100-3 newly starts the operation for establishing a link with the slave device 100-2.

Accordingly, the link between the slave device 100-2 and the slave device 100-3 will also be established immediately after the reset.

With the above-described method for establishing a link between the slave device 100-2 and the slave device 100-3, the link establishment operation in the industrial network system will be completed faster than that in a conventional industrial network system.

That is, the link establishment operation in the industrial network system will be completed immediately after a predetermined time period (time period twice as long as the time (T seconds) taken in Operation Example 1) has elapsed from a point in time at which the slave device 100-2 and the slave device 100-3 are turned on.

Advantages of Industrial Network System

The following can be concluded from the description of Operation Example 2 above. That is, if collision of link pulses occurs on N communication cables that correspond to N successive edges (side connecting two adjacent nodes) on the line topology after the start-up of the industrial network system, all communication links in the industrial network system will be established in T×N (for example, 4×N) seconds at a maximum.

Furthermore, even if two adjacent nodes (two slave devices 100) are started up at the same time (or perform reset processing at the same time), the probability of the collision between a link pulse transmitted from one slave device 100 and a link pulse transmitted from the other slave device 100 is not so high. Therefore, it is very rarely the case that the value of N increases.

Accordingly, the master device 200 can substantially reliably detect all the slave devices 100 within a predetermined time period (time period for detecting the slave device 100, for example, thirty seconds) after the start-up.

Furthermore, in the present embodiment, if a link pulse transmitted by the master device 200 collides with a link pulse transmitted by the slave device 100-1, the slave device 100-1 will perform reset processing for establishing a link with the master device 200.

Therefore, it is also advantageous in configuring the industrial network system according to the present embodiment that a well-known ordinary master device that is not implemented so as to perform reset processing can be used as the master device 200.

Modification 1 of Embodiment 1

In Embodiment 1, the MPU unit 130 is configured to indirectly reset the IN-side PHY unit 110 (and the OUT-side PHY unit 120) by resetting the COM unit 150, but the present invention is not limited to such a configuration.

That is, the MPU unit 130 may be configured not to reset the COM unit 150 at the timing of resetting the COM unit 150 in Embodiment 1, but to reset directly the IN-side PHY unit 110.

In this case, even if collision of link pulses occurs on N communication cables corresponding to N successive edges on the line topology after the start-up of the industrial network system, all communication links in the industrial network system will be established within T seconds.

Modification 2 of Embodiment 1

Embodiment 1 has a configuration in which the MPU unit 130 performs reset processing, but the present invention is not limited to such a configuration.

For example, the COM unit 150 may check the link status of the IN-side PHY unit 110 at a point in time at which a predetermined time period has elapsed from a point in time at which the slave device 100 is turned on, and may reset the IN-side PHY unit 110 if the checked link status is a status indicating a malfunction.

Modification 3 of Embodiment 1

In Embodiment 1, the MPU unit 130 resets the COM unit 150 and thereby lets the IN-side PHY unit 110 newly start an operation for establishing a link with a communication counterpart device.

However, the present invention is not limited to such a configuration.

That is, the MPU unit 130 may reset itself (restart) (that is, by restarting the entire slave device 100) and thereby lets the IN-side PHY unit 110 newly start the operation for establishing a link with a communication counterpart device.

Modification 4 of Embodiment 1

Embodiment 1 has a configuration in which the MPU unit 130 of a slave device 100 resets the COM unit 150 immediately after a predetermined time period has elapsed from a point in time at which the slave device 100 is turned on without a link between the IN-side PHY unit 110 and the communication counterpart device of the IN-side PHY unit 110 being established.

However, the present invention is not limited to such a configuration. That is, the MPU unit 130 of the slave device 100 may not necessarily monitor whether or not the link is established for a predetermined time period from the slave device 100 being turned on.

In the present modification in which the MPU unit 130 does not perform such monitoring (monitoring as to whether or not a link between the IN-side PHY unit 110 (second communication unit, a communication unit on the communication upstream side) and the communication counterpart device (second device) of the IN-side PHY unit 110 is established), the master device 200 may transmit, at a point in time at which a predetermined time period has elapsed after the master device 200 is turned on, a reset request to the slave devices 100 that have been detected at this point in time.

According to the present modification, in a slave device 100 that has not established a link with the communication counterpart device (first device) of the OUT-side PHY unit 120 (first communication unit, a communication unit on the communication downstream side), the MPU unit 130 may reset the COM unit 150 at the following timing.

That is, the MPU unit 130 may reset the COM unit 150 immediately after the time period from the point in time at which the slave device 100 is turned on to the point in time at which the reset request transmitted by the master device 200 is received.

Alternatively, the MPU unit 130 may reset the MPU unit 130 itself or the OUT-side PHY unit 120 immediately after that time period.

Note that in modification 4, the slave device 100 may not necessarily include the timer unit 140.

Embodiment 2

Hereinafter, an industrial network system according to another embodiment of the present invention will be described further with reference to FIGS. 8 to 11. Note that, for convenience of description, the same reference numerals are basically given to members having completely the same or substantially the same functions as those of the members described in Embodiment 1, and descriptions thereof are omitted.

Overview and Configuration of System

First, overview and configuration of the industrial network system according to the present embodiment will be described with reference to FIGS. 8 and 9.

FIG. 8 are block diagrams illustrating configurations of a slave device 100A and a master device 200A according to the present embodiment. FIG. 9 is a diagram illustrating a configuration of connection of the industrial network system according to the present embodiment.

Figure 8A:
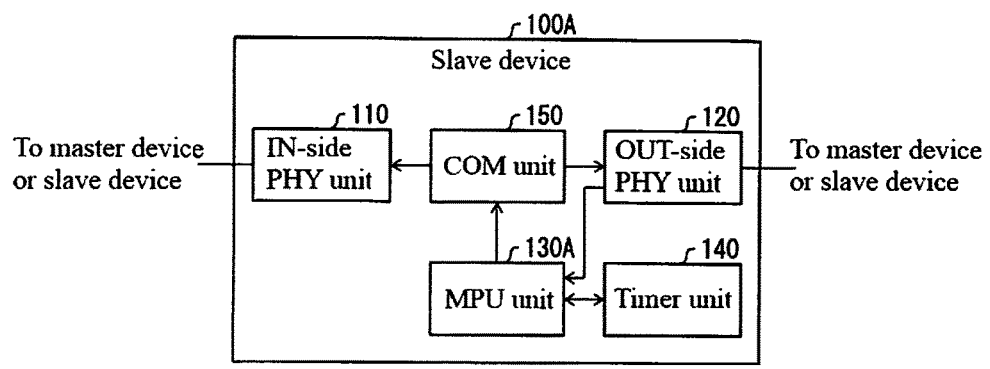
FIGS. 8A and 8B are block diagrams illustrating configurations of a master device and a slave device according to Embodiment 2 of the present invention.
Figure 8B:
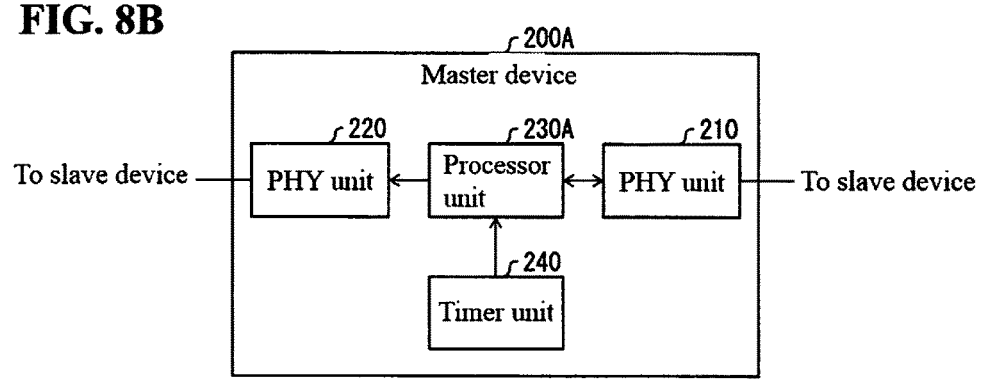
Figure 9:
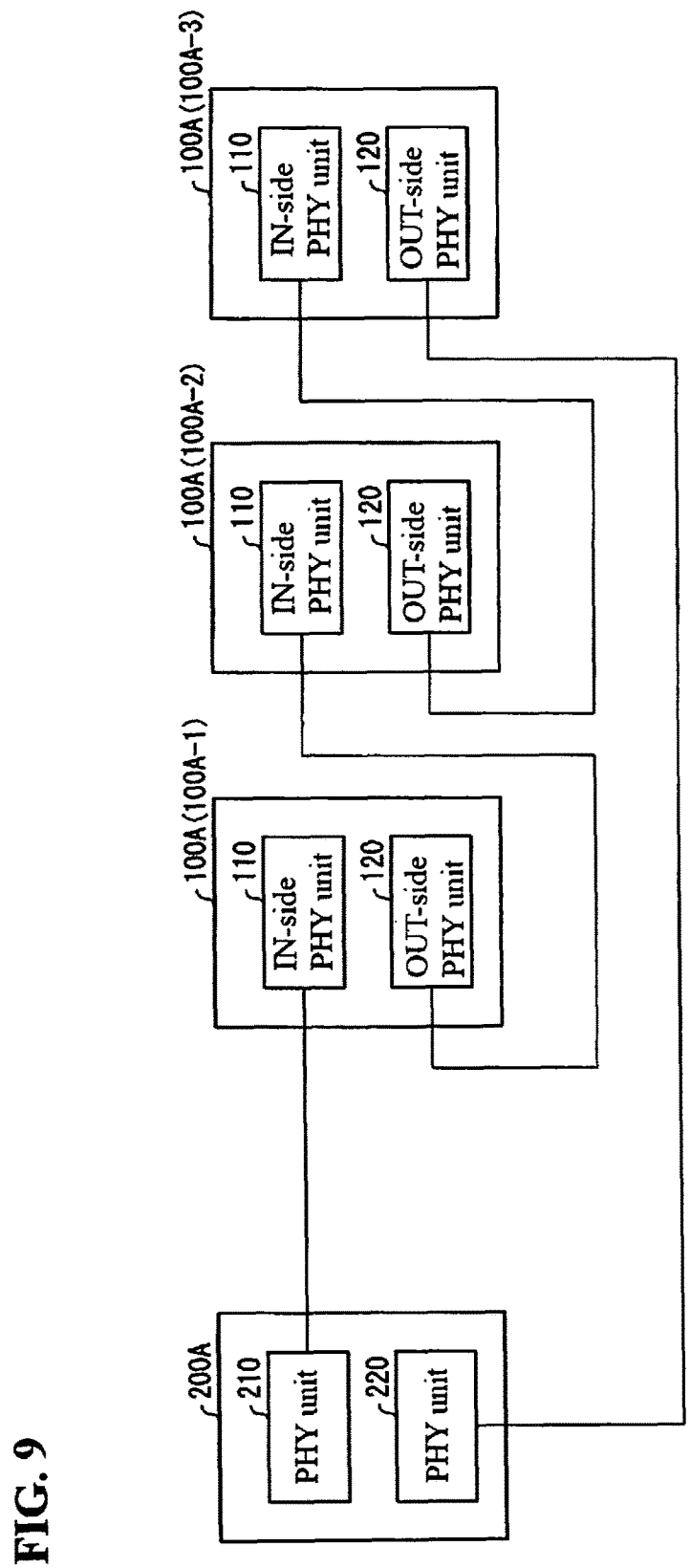
FIG. 9 is a diagram illustrating a configuration of connection in an industrial network system according to Embodiment 2, the industrial network system including a plurality of the slave devices of FIG. 8 and one master device of FIG. 8.

As is clear from FIGS. 8 and 9, the industrial network system according to the present embodiment includes multiple (three in the present embodiment) slave devices 100A, and one master device 200A.

Furthermore, as is clear from FIG. 9, the network topology of the industrial network system according to the present embodiment is a ring topology.

As is clear from FIGS. 8 and 9, the two nodes of every pair of adjacent nodes are physically connected to each other by a communication cable.

Hereinafter, a configuration of the slave device 100A will be described with reference to FIG. 8A.

Configuration of Slave Device 100A

As shown in FIG. 8A, the slave device 100A includes the IN-side PHY unit 110, the OUT-side PHY unit 120, a MPU unit 130A, the timer unit 140, and the COM unit 150.

The IN-side PHY unit 110 is a communication unit (second communication unit) for communicating with the master device 200A or another slave device 100A (second device), and has the same function as that of the IN-side PHY unit 110 according to Embodiment 1.

The OUT-side PHY unit 120 is a communication unit (first communication unit) for communicating with the master device 200A or another slave device 100A (first device), and has the same function as that of the OUT-side PHY unit 120 according to Embodiment 1.

The MPU unit 130A is a processor that controls the entire slave device 100A. The MPU unit 130A starts the timer unit 140 from a point in time at which the slave device 100A is turned on, and starts monitoring whether or not a link between the OUT-side PHY unit 120 and the communication counterpart device of the OUT-side PHY unit 120 is established.

If a count value of the timer unit 140 shows that a predetermined time period has elapsed without the link between the OUT-side PHY unit 120 and the communication counterpart device of the OUT-side PHY unit 120 being established, the MPU unit 130A performs processing for resetting the COM unit 150 immediately after the predetermined time period.

The configuration of the slave device 100A has been described so far.

Hereinafter, the configuration of the master device 200A will be described with reference to FIG. 8B.

Configuration of Master Device 200A

As shown in FIG. 8B, the master device 200A includes a PHY unit 210, a PHY unit 220, a processor unit 230A, and a timer unit 240.

The PHY unit 210 and the PHY unit 220 are a communication unit for communicating with the slave device 100A, and have the same functions as those of the IN-side PHY unit 110 and the OUT-side PHY unit 120.

The processor unit 230A is a processor that controls the entire master device 200A. The processor unit 230A starts the timer unit 240 at a point in time at which the master device 200A is turned on, and starts monitoring whether or not a link between the PHY unit 210 and the communication counterpart device of the PHY unit 210 is established.

If a count value of the timer unit 240 shows that a predetermined time period has elapsed without a link between the PHY unit 210 and the slave device 100A being established, the processor unit 230A will perform processing for resetting the PHY unit 210 immediately after the predetermined time period.

The timer unit 240 has the same function as that of the timer unit 140.

Figure 10:
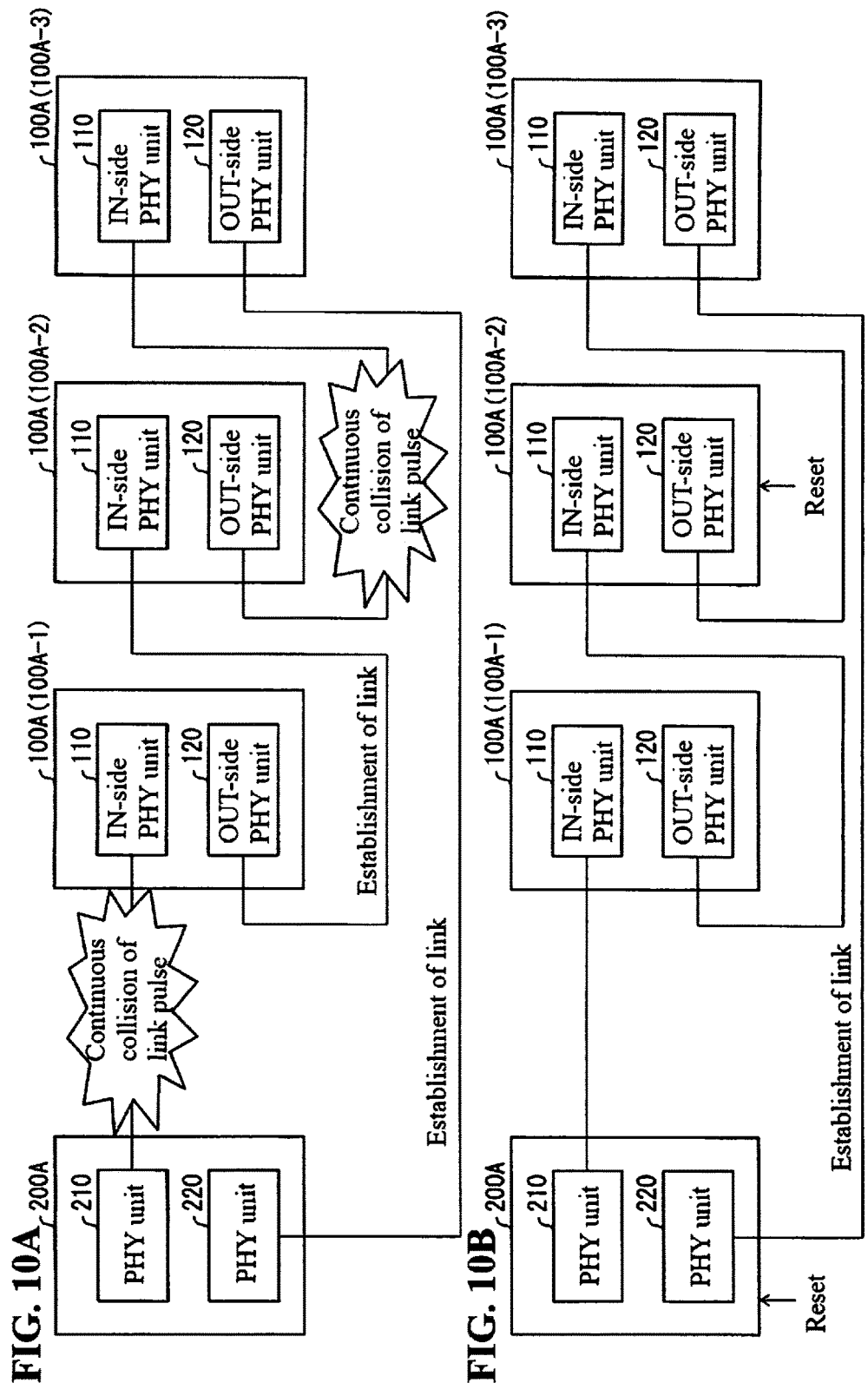
FIGS. 10A and 10B are diagrams illustrating an operation example of the industrial network system according to Embodiment 2.
Figure 11:
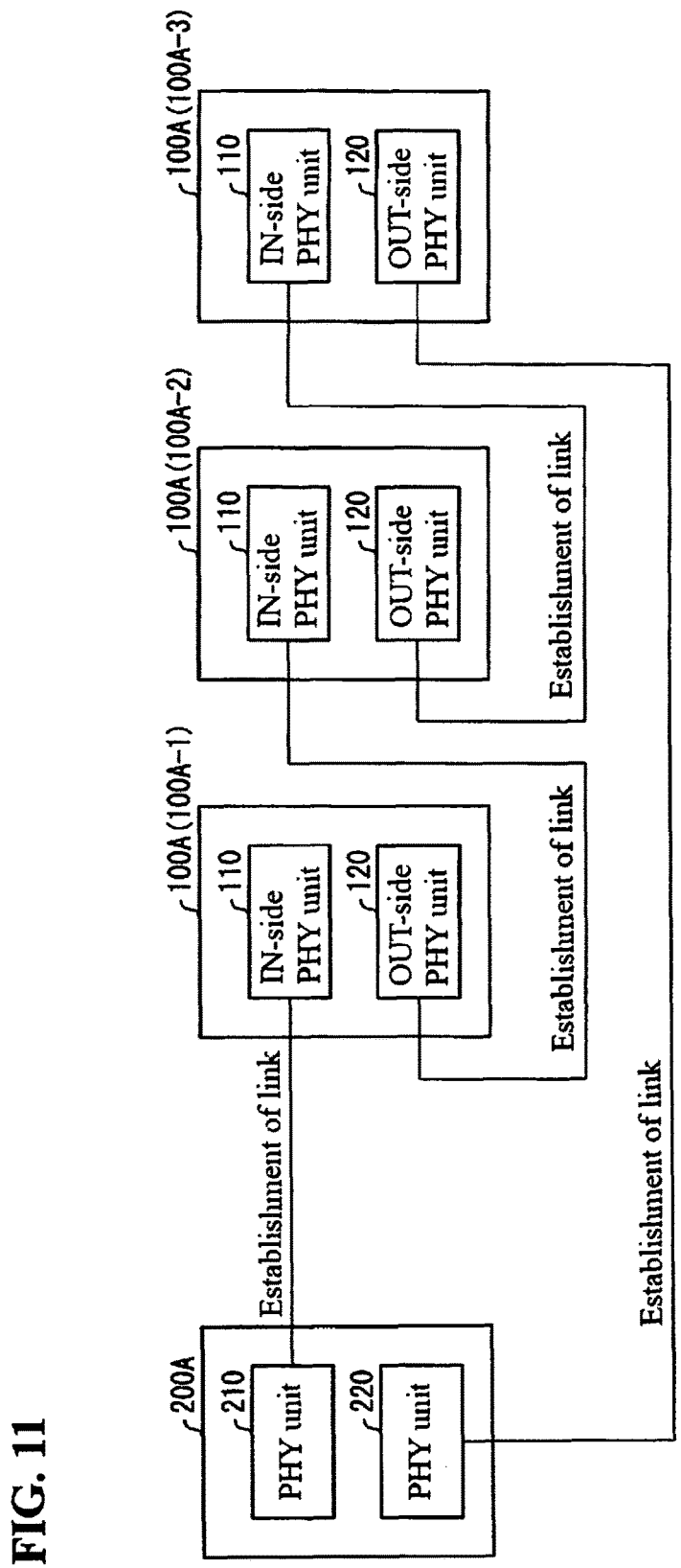
FIG. 11 is another diagram illustrating the operation example of the industrial network system according to Embodiment 2.
Figure 12A:
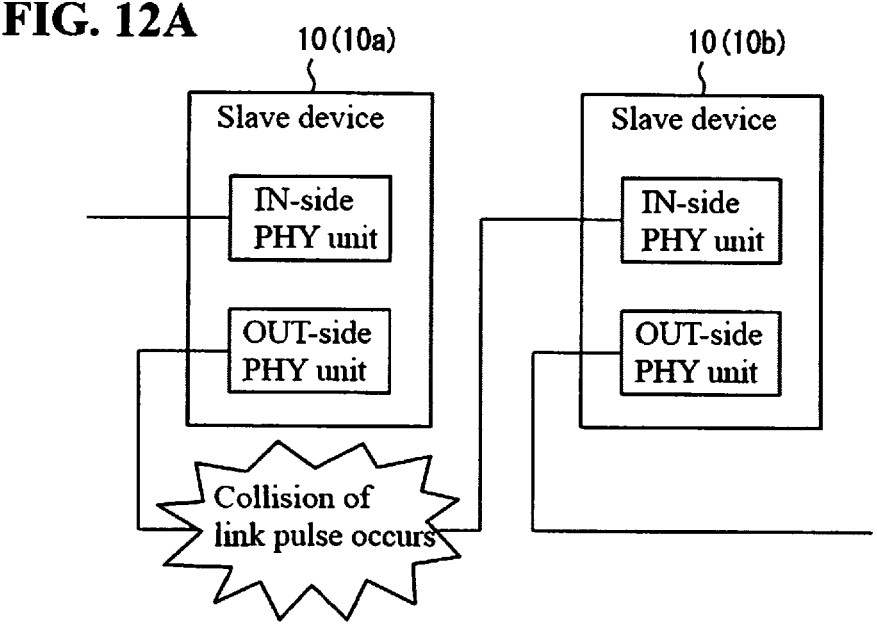
FIGS. 12A and 12B illustrate states of conventional communication that is between two slave devices that are included in a conventional industrial network system and poses the problem that establishment of a link between the two slave devices is delayed.
Figure 12B:
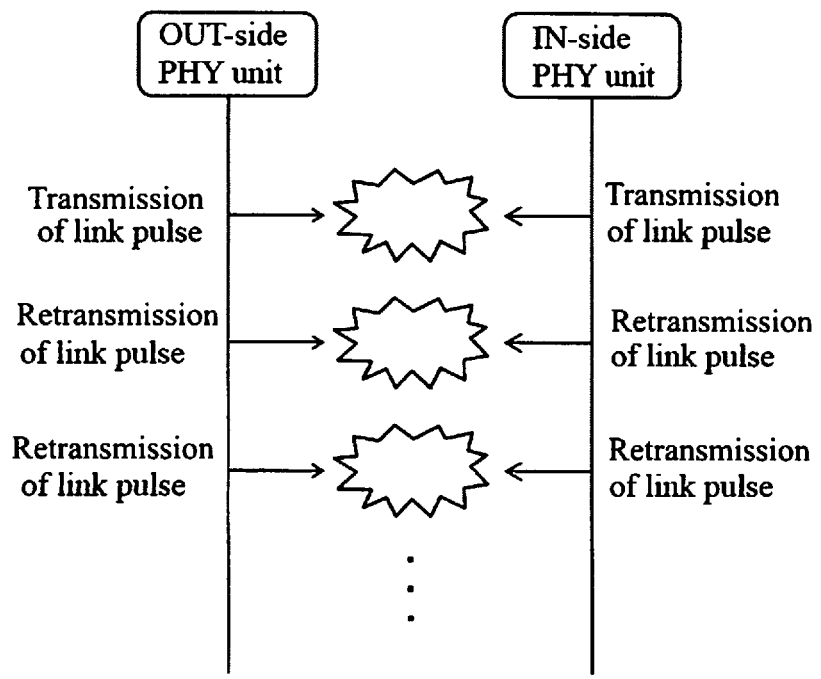

The following will describe an example of an operation in the start-up stage of the industrial network system, in a case where all devices constituting the industrial network system according to the present embodiment are tuned on at the same time, with reference to FIGS. 10 and 11. FIGS. 10 and 11 are diagrams illustrating the operation example of the industrial network system.

Operation Example of Industrial Network System

Hereinafter, the operation example of the industrial network system will be described. In this operation example, a slave device 100A-2 and the master device 200A perform a specific operation, and thus the description of the operation example of the industrial network system will be given while focusing mainly on the slave device 100A-2 and the master device 200A.

Assume that all the devices constituting the industrial network system are turned on at the same time, and a link between two devices of every pair is immediately established (except for a pair of the master device 200A and a slave device 100A-1, and a pair of the slave device 100A-2 and a slave device 100A-3).

On the other hand, assume that, as shown in FIG. 10A, a link between the master device 200A and the slave device 100A-1, and a link between the slave device 100A-2 and the slave device 100A-3 are not immediately established due to the same reason as that described in Embodiment 1.

As described above, the MPU unit 130 of the slave device 100A-2 starts the timer unit 140 at a point in time at which the slave device 100A-2 is turned on, and starts monitoring from that point in time whether or not the link between the OUT-side PHY unit 120 of the slave device 100A-2 and the slave device 100A-3 is established.

Similarly, the processor unit 230A of the master device 200A starts the timer unit 240 at a point in time at which the master device 200A is turned on, and starts monitoring from that point in time whether or not the link between the PHY unit 210 of the master device 200A and the slave device 100A-1 is established.

After the point in time at which the slave device 100A-2 is turned on, the OUT-side PHY unit 120 of the slave device 100A-2 repeatedly (continuously) transmits a link pulse at a predetermined timing (the same timing as the timing at which the slave device 100A-3 transmits a link pulse to the slave device 100A-2).

Similarly, after the point in time at which the master device 200A is turned on, the PHY unit 210 of the master device 200A repeatedly (continuously) transmits a link pulse at a predetermined timing (the same timing as the timing at which the slave device 100A-1 transmits a link pulse to the master device 200A).

When the timer unit 140 of the slave device 100A-2 shows that a predetermined time period has elapsed from the point in time at which the slave device 100A-2 is turned on without the link between the OUT-side PHY unit 120 of the slave device 100A-2 and the slave device 100A-3 being established, the MPU unit 130A of the slave device 100A-2 resets its COM unit 150 immediately thereafter (see FIG. 10B).

Similarly, when the timer unit 240 of the master device 200A shows that a predetermined time period has elapsed from the point in time at which the master device 200A is turned on without the link between the PHY unit 210 of the master device 200A and the slave device 100-1 being established, the processor unit 230A of the master device 200A resets the PHY unit 210 immediately thereafter (see FIG. 10B).

As a result, with the reset serving as a trigger, the PHY unit 210 of the master device 200A, and the IN-side PHY unit 110 and OUT-side PHY unit 120 of the slave device 100A-2 newly start an operation for establishing a link with the corresponding communication counterpart devices.

Accordingly, the link between the master device 200A and the slave device 100A-1, and the link between the slave device 100A-2 and the slave device 100A-3 will be established (see FIG. 11) immediately after the reset.

Advantage of Industrial Network System

Also in the present embodiment, similarly to Embodiment 1, the master device 200A can substantially reliably detect all the slave devices 100A within a predetermined time period (time period for detecting the slave devices 100A, for example, thirty seconds) after the start-up.

Modification of Embodiment 2

When the timer unit 140 of the slave device 100A-2 shows that a predetermined time period has elapsed from the point in time at which the slave device 100A-2 is turned on without the link between the OUT-side PHY unit 120 and the communication counterpart device of the OUT-side PHY unit 120 being established, the MPU unit 130A of the slave device 100A-2 may reset the OUT-side PHY unit 120 immediately thereafter.

The MPU unit 130A may start, from the point in time at which the slave device 100A is turned on, monitoring whether or not the link between the OUT-side PHY unit 120 and the communication counterpart device of the OUT-side PHY unit 120 is established, and monitoring whether or not the link between the IN-side PHY unit 110 and the communication counterpart device of the IN-side PHY unit 110 is established.

When a count value of the timer unit 140 shows that a predetermined time period has elapsed without the link between the IN-side PHY unit 110 and the communication counterpart device of the IN-side PHY unit 110 being established, the MPU unit 130A may perform processing for resetting the COM unit 150 or the IN-side PHY unit 110 immediately after the predetermined time period.

Note that it is preferable that the slave device 100A be implemented such that the MPU unit 130A performs the following reset processing.

The MPU unit 130A performs processing for resetting the OUT-side PHY unit 120 immediately after a count value of the timer unit 140 shows that t seconds have elapsed without the link between the OUT-side PHY unit 120 and the communication counterpart device of the OUT-side PHY unit 120 being established.

The MPU unit 130A performs processing for resetting the IN-side PHY unit 110 immediately after a count value of the timer unit 140 shows that t' (≠t) seconds have elapsed without the link between the IN-side PHY unit 110 and the communication counterpart device of the IN-side PHY unit 110 being established.

The reason is that the slave device 100A that is implemented as described above has an advantage as will be described below.

That is, when t seconds have elapsed from two slave devices 100A are started without a link between the two slave devices 100A being established, only one of the two slave devices 100A performs the reset processing immediately after the elapse of t seconds.

Accordingly, the slave device 100A implemented as described above prevents the occurrence of the problem caused by the slave device 100A and another slave device 100A connected to that slave device 100A via a communication cable performing reset processing at the same time. That is, the slave device 100A has an advantage of preventing the occurrence of the problem that the link with the other slave device 100A cannot be immediately established due to repeated collision between a link pulse from the device itself and a link pulse from the other slave device 100A also after the reset processing.

INDUSTRIAL APPLICABILITY

The present invention is advantageously applicable to an industrial network system.

The invention claimed is:
1. A communication device comprising:
  a first communication unit, comprising a first network interface that communicates with a first device, wherein the first device is a master device or a slave device;
  a second communication unit, comprising a second network interface that communicates with a second device, wherein the second device is a master device or a slave device; and
  a processor; wherein:
    the communication device is a master device or a slave device;
    immediately at a point in time at which the communication device is turned on, the first communication unit and the second communication unit start an operation for transmitting a link pulse at a predetermined timing so as to establish a link with at least one of the first device and the second device;
    the operation for transmitting the link pulse at the predetermined timing is performed during a time period from the point in time at which the communication device is turned on to a given point in time; and
    the processor is configured with a program to perform operations comprising, immediately after the given point in time, reset processing such that, when the time period has elapsed without the link between the first communication unit and the first device being established, the reset processing causes the first communication unit to newly start the operation for transmitting.

2. The communication device according to claim 1, wherein
  the first communication unit is on an in-side of the communication device; and
  the second communication unit is on an out-side of the communication device.

3. The communication device according to claim 1, further comprising:
  a slave controller coupled to the first communication unit and the second communication unit,
  wherein
  the processor is configured with the program to perform operations such that the reset processing further comprises providing a reset to the slave controller immediately after the given point in time, and
  the first communication unit and the second communication unit are configured to start the operation for transmitting the link pulse at the predetermined timing based on the reset.

4. The communication device according to claim 1, wherein the time period comprises a predetermined length from the point in time at which the communication device is turned on.

5. The communication device according to claim 1, further comprising:
  a slave controller; wherein
    the processor is configured with the program to perform operations further comprising:
      controlling the slave controller; and
      resetting itself immediately after the given point in time.

6. The communication device according to claim 1, wherein
  the first communication unit is on an out-side of the communication device;
  the second communication unit is on an in-side of the communication device;
  the given point in time is a point in time at which a reset request transmitted by a master device is received; and
  the processor is configured with the program to perform operations to reset the first communication unit immediately after the time period in accordance with the reset request.

7. A method for establishing a link between a first device and a second device, wherein
  the first device is a master device or a slave device;
  the second device is a master device or a slave device; and
  the method is performed by a communication device comprising a first communication unit, comprising a first network interface, for communicating with the first device, a second communication unit, comprising a second network interface, for communicating with the second device, and a processor;

the method comprising:
   transmitting, via the first communication unit and the second communication unit, immediately at a point in time at which the communication device is turned on, a link pulse at a predetermined timing so as to respectively establish links with the first device and second device;
   continuing to transmit the link pulse, via the first communication unit, at the predetermined timing during a time period from the point in time at which the communication device is turned on to a given point in time; and
   performing, via the processor, when the time period has elapsed without the link between the first communication unit and the first device being established, reset processing causing the first communication unit to newly start the transmission of the link pulse at the predetermined timing.

8. The method according to claim 7, wherein the first communication unit is on an in-side of the communication device and the second communication unit is on an out-side of the communication device.

9. The method according to claim 7, wherein the time period has a predetermined length from the point in time at which the communication device is turned on.

10. The method according to claim 7, wherein
   the communication device further comprises a slave controller controlled by the processor; and
   performing, via the processor, when the time period has elapsed without the link between the first communication unit and the first device being established, the reset processing, comprises the processor resetting itself immediately after the time period.

11. The method according to claim 7, wherein
   the first communication unit is on an out-side of the communication device;
   the second communication unit is on an in-side of the communication device;
   the given point in time is a point in time at which a reset request transmitted by a master device is received; and
   performing, via the processor, in a condition in which the time period has elapsed without the link between the first communication unit and the first device being established, the reset processing, comprises resetting, via the processor, the first communication unit immediately after the time period in accordance with the reset request.

* * * * *